March 16, 1948.   A. R. WOOD   2,437,871
MAGNETIC COUPLING
Filed Feb. 9, 1943
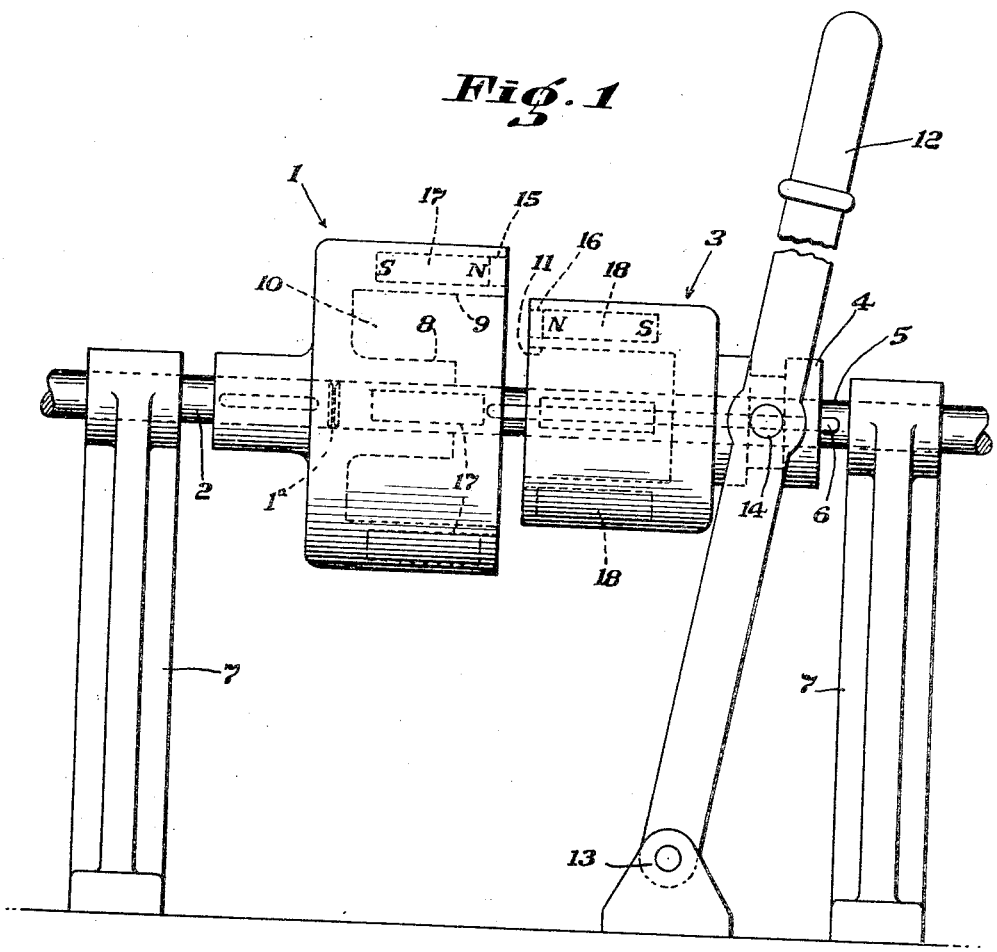
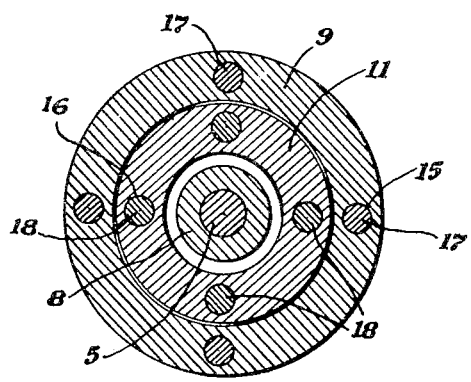
INVENTOR.
ALFRED R. WOOD
BY Spear, Rawlings & Spear
ATTORNEYS Patented Mar. 16, 1948

2,437,871

UNITED STATES PATENT OFFICE 2,437,871

MAGNETIC COUPLING

Alfred R. Wood, Portland, Maine

Application February 9, 1943, Serial No. 475,320

3 Claims. (Cl. 172—284)

My present invention relates to clutches in which the drive and driven members are coupled by the force of permanent magnets.

While the many different types of friction clutches that are available provide satisfactory means for coupling shafts, they are, in general, expensive to manufacture and do not ensure against overloads.

In accordance with my invention, I provide coupling means comprising a drive member and a driven member, one of which is slidable with reference to the other so that it may be moved into or out of an operative position by suitable actuating mechanism. The members include portions shaped to nest without contact one within the other in their operative position and each portion carries a set of permanent magnets so disposed that in their operative position, all the north poles of one set are in operative proximity to all the south poles of the other set, while in the inoperative position of the members, all the like poles of both sets of magnets are so disposed that their mutual action is one of repulsion.

By this construction, I provide shaft coupling means in which the driving and driven members may be inexpensively made while ensuring against overloads. By the arrangement of the permanent magnets which ensures maximum attraction when the members are in their operative position and maximum repulsion when the members are inoperatively positioned, I provide magnetic assistance in the actuation of coupling means in accordance with my invention.

In the accompanying drawings, I have shown an illustrative embodiment of my invention from which its novel features and advantages will be readily apparent.

In the drawings:

Fig. 1 shows a magnetic clutch in accordance with my invention with the drive and driven members in their inoperative position, and Fig. 2 is a section through the drive and driven members in their operative position.

At 1, I have indicated a drive member carried by the drive shaft 2 and at 3 I have shown a driven member having a shifter collar 4. The member 3 is slidably splined to the driven shaft 5, the spline way being indicated at 6.

The shafts 2 and 5 are shown as mounted in conventional supports 7 and for convenience I have shown the shaft 5 as rotatably supported within the hub 8 of the drive member 1. While I have indicated at 1ª a pilot bearing, I have omitted from the drawings other bearings, bushings and the like as these are conventional.

The drive member 1 is formed with an annular flange 9 defining with the hub 8 an annular recess 10. The driven member 3 includes an annular flange 11, the outside diameter of which is slightly less than the inside diameter of the flange 9 and the inside diameter of which is slightly greater than the outside diameter of the hub 8 so that in the operative position of the members the flange 11 nests within the flange 9 without contact with any part of the drive member 1.

I have shown a shifter lever 12 as indicative of clutch actuating means. The lever 12 is shown as pivotally mounted as at 13 and carries pivot studs 14 engaging with the collar 4 so that the member 3 may be slid on the shaft 5 into and out of its operative position.

The annular flanges 9 and 11, which are of non-magnetic material, are formed with a plurality of spaced chambers 15 and 16 respectively, disposed parallel to each other and to the axis of the shafts. In the chambers 15, I position a set of permanent magnets 17 of the bar type with their north poles all disposed in the same direction, while in the chambers 16 I position a set of permanent magnets 18 also of the bar type with their north poles all disposed in the same direction but opposite to that of the corresponding poles of the set of magnets 17. While I have shown the chambers 15 and 16 as bores, the chambers may be formed to expose the entire length of the magnets.

By thus positioning the sets of magnets 17, 18, I not only provide for their strong mechanical support, but also ensure that in the inoperative position of the members 1 and 3 (Fig. 1) the mutual action of the magnets is one of repulsion, while in the operative position of clutches in accordance with my invention, the mutual action of all the magnets is constantly one of attraction so that magnetic force is effective to couple the members 1 and 3 smoothly and positively. The magnets may be otherwise positioned in certain instances provided that like poles of the magnets have a common path and that, where each member carries a set of magnets, opposite poles are in operative proximity when the clutch members are in their operative position.

While only one set of magnets may be employed, the use of two sets of magnets is preferred as it increases the magnetic force and provides magnetic action to assist in the positioning of the members 3 relative to the member 1 under the influence of the actuating means. Where only one member is provided with a set of permanent magnets, the other member is constructed to present a surface of magnetic material to provide the desired magnetic flux.

By this construction, it will be seen that in accordance with my invention, I have provided simple and effective coupling means admirably adapted to ensure against overloads.

What I therefore claim and desire to secure by Letters Patent is:

1. A clutch comprising a driving member and a driven member, one of said members being slidable with reference to the other, each of said members including annular portions of non-magnetic material, the outside diameter of one of which is less than the inside diameter of the other so that one of said portions may nest within the other without contact therewith, a set of spaced permanent magnets of the bar type carried by each of said annular portions so that the magnetic action is effective to couple said members when said portions are nested, each set of magnets being disposed parallel to the other set and to the axis of the members with all the north poles of each set being radially alined but disposed in a direction opposite to the other set, and means to slide one of said members relative to the others thereby to bring the annular portions into and out of their nested relation.

2. A clutch comprising a driving member and a driven member, one of said members being slidable with reference to the other, each of said members being of non-magnetic material, one of said members comprising a hub and an annular flange defining therewith an annular recess and the other of said members including an annular flange, the outside diameter of which is less than the inside diameter of said first named flange and the inside diameter of which is greater than the outside diameter of said hub so that said second named flange may enter said recess without contact with said first named flange and with said hub, a set of spaced permanent magnets carried by each of said flanges in parallel with the axis of said members but with the north poles of one set being disposed oppositely to the north poles of the other set, so that magnetic attraction is operative to couple said members when said flanges are nested, and means to slide said slidable member into and out of its operative position.

3. The clutch of claim 2 in which there are the same number of magnets in each set and the magnets are spaced to be radially alined when the members are coupled.

ALFRED R. WOOD.

REFERENCES CITED

The following references are of record in the file of this patent:

UNITED STATES PATENTS

| Number | Name | Date |
|---|---|---|
| 429,314 | MacQuesten | June 3, 1890 |
| 1,608,231 | Bradley | Nov. 23, 1906 |
| 1,862,267 | Honig | June 7, 1932 |
| 2,241,983 | Connolly | May 13, 1941 |